Figure 2:
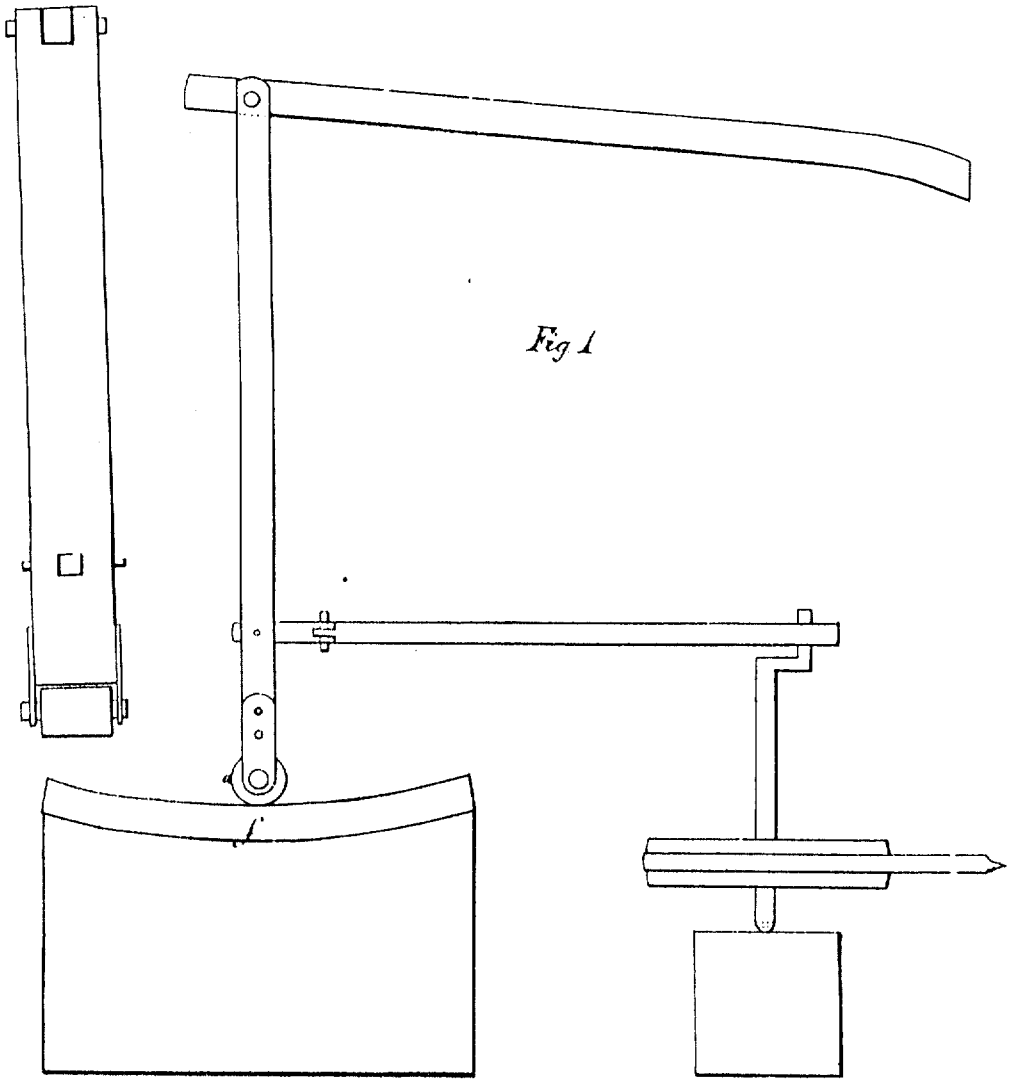

X0001819

W. Edwards

Dressing Leather.

Patented Oct. 19, 1812.

1819X

William Edwards. Letters Patent Dated Oct 19th 1812.

The schedule referred to in these Letters Patent, and making part of the same,
containing a description in the words of the said William Edwards him
self of his Machine for Compressing Leather—

This Machine is of Brass, Copper, Iron or a composition of Met
als, the roller may be of various sizes the most useful one is six inch
es long and three inches in diameter, made perfectly round and true
with gudgeons at the ends, these are inserted into sockets secured
to the end of a piece of timber of a width corresponding to the lengths
of the roller, the opposite end of the timber which should be about
nine feet long is connected by iron pivots to a piece of timber of
six inches square of considerable length so placed that it will be
elastic or will spring — placed in a horizontal position which
will bring the timber to which this roller is fixed in a perpendicular
position; the roller is made to vibrate by being connected with a hor
izontal wheel with a crank and the rollers by the principle of
levers is brought with force upon the leather which should be placed
on a bed of solid timber the top of which should be adapted to the
proportion of a circle made by the vibration of the roller, Sole leather
rolled with this machine requires little or no hammering by the
shoemaker and from its being fully extended is used by the shoe
makers with a saving of at least ten pr. centum and is more solid
and durible.—

In the presence of us
Daniel Stebbins
S. Stoddard Jr signed William Edwards ( Received and Recorded anew April 5th 1843 )

Drawing made (65)